(12) United States Patent
Chi

(10) Patent No.: US 6,655,473 B1
(45) Date of Patent: Dec. 2, 2003

(54) HAND TOOL WITH AN ADJUSTABLE ROTATIONAL SPEED AND TORSION FORCE

(76) Inventor: Ying Fang Chi, No. 50, Lane 311, Kuang Fu Rd., Taichung (TW)

( * ) Notice: Subject to any disclaimer, the term of this patent is extended or adjusted under 35 U.S.C. 154(b) by 0 days.

(21) Appl. No.: 10/331,471

(22) Filed: Dec. 31, 2002

(51) Int. Cl.[7] ............................. F16H 1/28; B25D 11/04
(52) U.S. Cl. ...................... 173/216; 173/47; 173/176; 173/213
(58) Field of Search .................... 173/47, 216, 176, 173/178, 213, 48; 192/56–61, 69–91; 81/469, 467, 473

(56) References Cited

U.S. PATENT DOCUMENTS

| | | | | |
|---|---|---|---|---|
| 4,892,013 A | * | 1/1990 | Satoh | 173/176 |
| 5,277,527 A | * | 1/1994 | Yokota et al. | 173/178 |
| 5,385,512 A | * | 1/1995 | Moolenaar et al. | 173/176 |
| 5,550,416 A | * | 8/1996 | Fanchang et al. | 173/216 |
| 6,070,675 A | * | 6/2000 | Mayer et al. | 173/48 |
| 6,142,242 A | * | 11/2000 | Okumura et al. | 173/216 |
| 6,202,759 B1 | * | 3/2001 | Chen | 173/216 |

* cited by examiner

Primary Examiner—Scott A. Smith
(74) Attorney, Agent, or Firm—Rosenberg, Klein & Lee

(57) ABSTRACT

A hand tool with an adjustable rotational speed and torsion force includes a shaft rotatably received in a body of the hand tool and driven by a motor that is mounted in the body. A first planet gear set is longitudinally connected to one end of the shaft opposite to the motor and a second planet gear set is longitudinally connected to the first planet gear set. The shaft is longitudinally movable in the body. The hand tool only has the first planet gear set acted thereon when the shaft is pushed toward the second planet gear set. The first planet gear set and the second planet gear set are acted on the hand tool at the same time when the shaft is pulled.

6 Claims, 9 Drawing Sheets

HAND TOOL WITH AN ADJUSTABLE ROTATIONAL SPEED AND TORSION FORCE

BACKGROUND OF THE INVENTION

1. Field of the Invention

The present invention relates to a hand tool, and more particularly to a hand tool with an adjustable rotational speed and torsion force to change the rotational speed and the output torsion force of a tool holder of the hand tool.

2. Description of Related Art

A conventional pneumatic hand tool in accordance with the prior art shown in FIG. 8 comprises an L-shaped body (6) having a first section and a second section. A motor (62) is mounted in the first section of the body (6) and has an axle (621) partially received in the motor (62). A first bevel gear (623) is mounted on a free end of the axle (621). An output axle (7) is longitudinally and rotatably mounted in the second section of the body (6). A second bevel gear (624) is securely mounted around the output axle (7) and engaged the first bevel gear (621). A tool holder (8) is partially rotatably received in the body (6) and fixedly connected to one end of the output axle (7). The second bevel gear and the output axle (7) are driven by the first bevel gear (623) to drive tool holder (8) when the motor (62) is operated.

The conventional pneumatic hand tool is usually used to drive a screw or drill a hold. However, to drive a screw needs a torsion force greater than that to drill hole. The conventional pneumatic hand tool has no device to change the output rotational speed and torsion force such that the conventional is not suitable to various work types. Consequently, an adjusting valve (63) is mounted to the body (6) to control a compressed air current that flows into the body (6) to drive the motor. A small air current will cause a slow rotational speed and a small torsion force. However, a small torsion force is hard to filly drive a screw into a work piece.

With reference to FIG. 9 that shows a second conventional hand tool. The second conventional hand tool has a body (9) and an output axle (91) rotatably mounted in the body (9). The output axle (91) is driven by a motor (not shown) and has a free end. A first planet gear set (92) and a second planet gear set (93) are sequentially mounted on the free end of the output axle (91). Consequently, the second conventional hand tool can provide a torsion force greater than that of the above conventional hand tool. However, the output rotational speed and torsion force of the second conventional hand tool still cannot be changed to suit various work condition.

The present invention has arisen to mitigate and/or obviate the disadvantages of the two conventional hand tools.

SUMMARY OF THE INVENTION

The main objective of the present invention is to provide an improved hand tool with an adjustable rotational speed and torsion force.

To achieve the objective, the hand tool in accordance with the present invention comprises a shaft rotatably received in a body of the hand tool and driven by a motor that is mounted in the body. A first planet gear set is longitudinally connected to one end of the shaft opposite to the motor and a second planet gear set is longitudinally connected to the first planet gear set. The shaft is longitudinally movable in the body. The hand tool only has the first planet gear set acted thereon when the shaft is pushed toward the second planet gear set. The first planet gear set and the second planet gear set are acted on the hand tool at the same time when the shaft is pulled.

Further benefits and advantages of the present invention will become apparent after a careful reading of the detailed description with appropriate reference to the accompanying drawings.

DETAILED DESCRIPTION OF THE INVENTION

Figure 1:
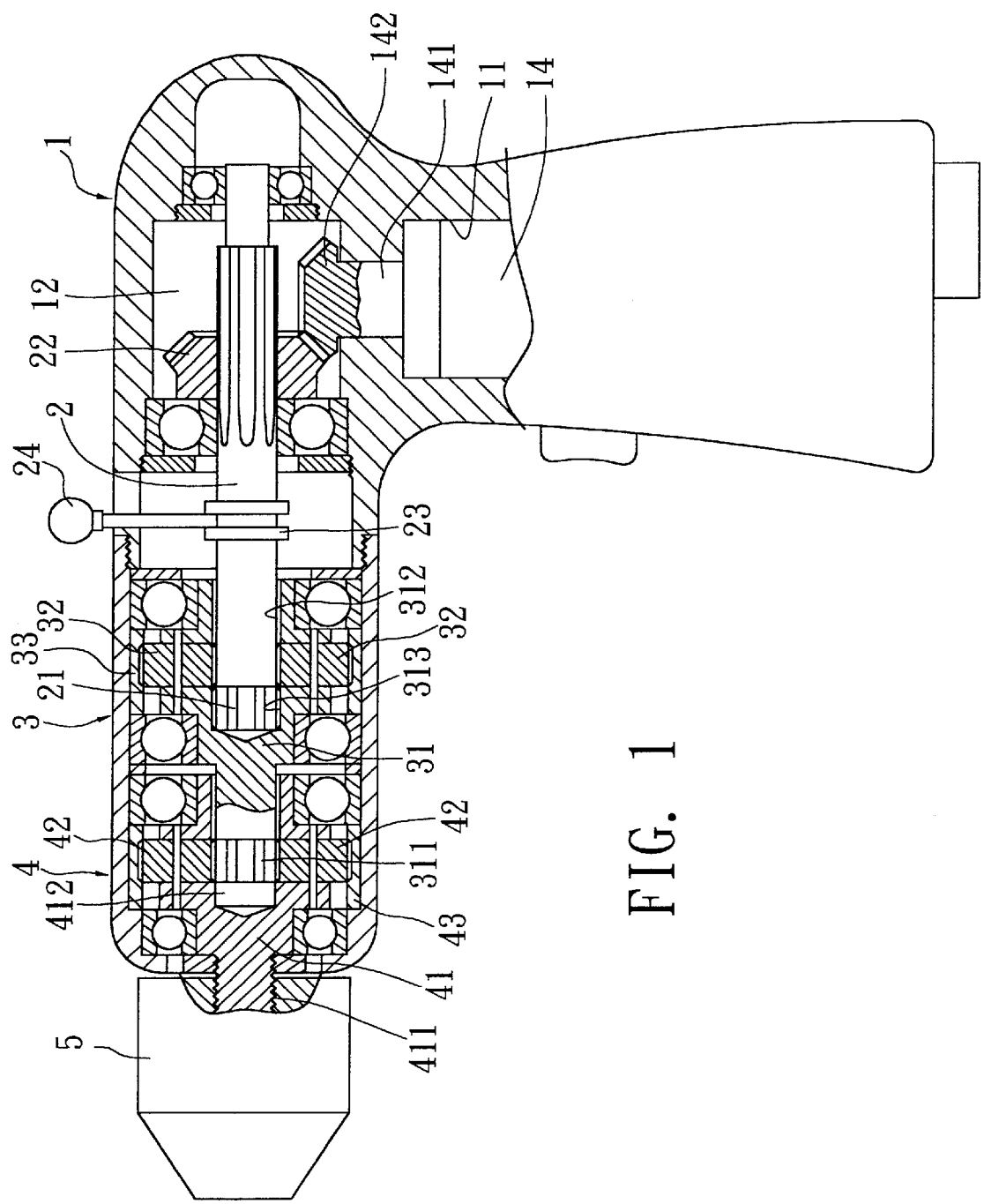
FIG. 1 is a side cross sectional view of a hand tool with an adjustable rotational speed and torsion force in accordance with the present invention.
Figure 2:
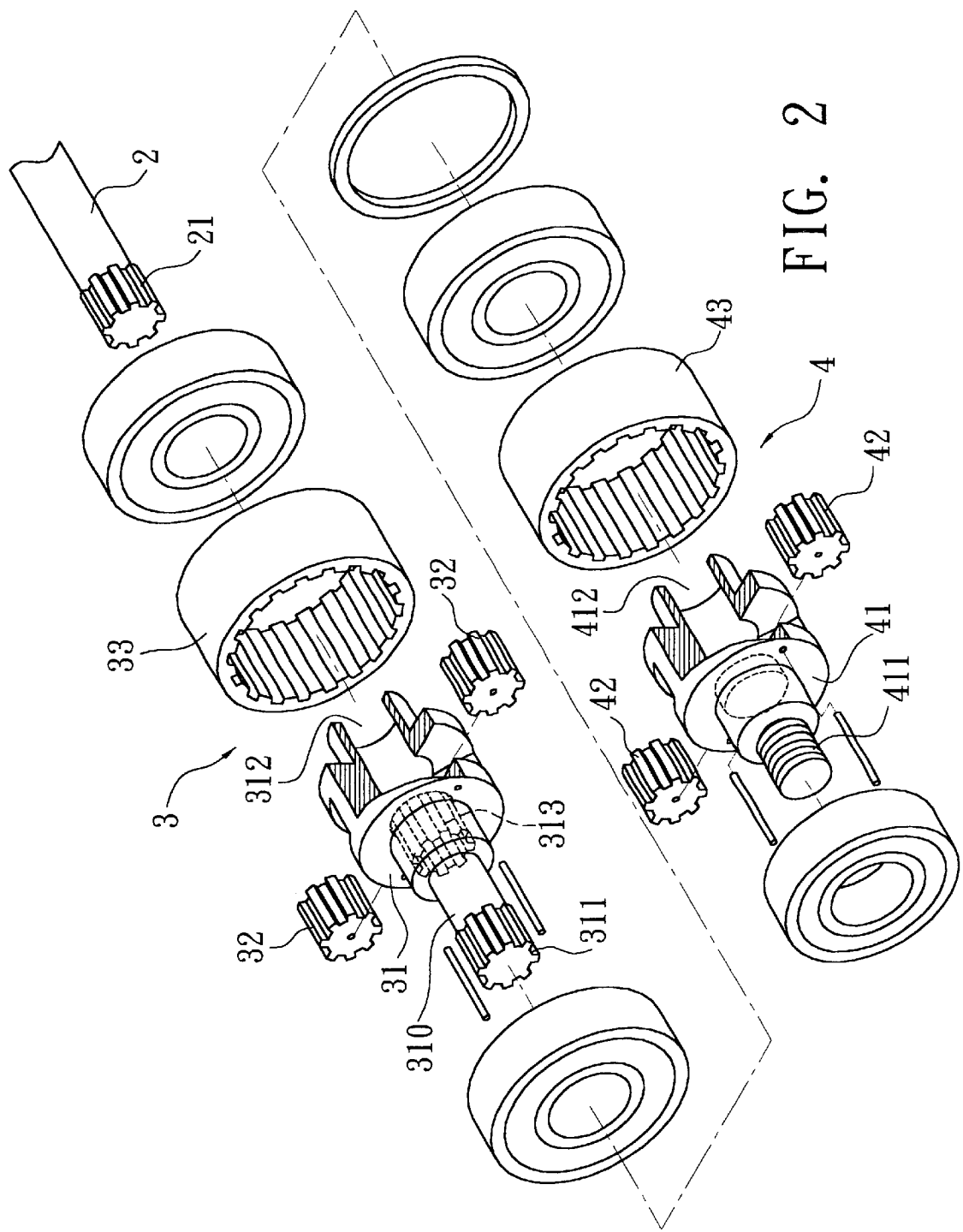
FIG. 2 is an exploded perspective view of the hand tool in FIG. 1.
Figure 3:
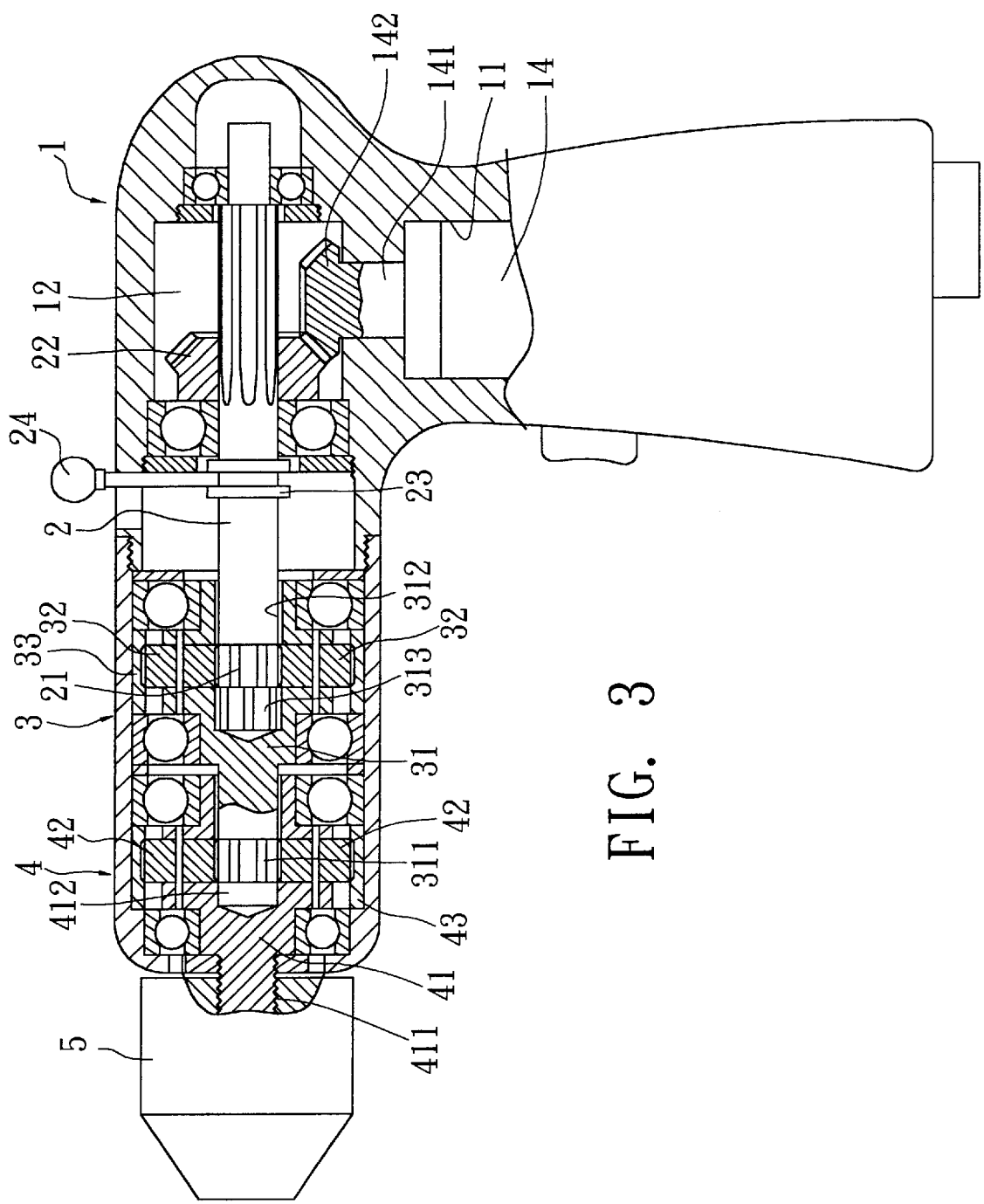
FIG. 3 is another side cross sectional view of the hand tool with an adjustable rotational speed and torsion force in accordance with the present invent.

Referring to the drawings and initially to FIGS. 1–3, a hand tool with an adjustable rotational speed and torsion force in accordance with the present invention comprises a hollow body (1), a shaft (2) rotatably mounted in the body (1), a first planet gear set (3) mounted on one end of the shaft (2), a second planet gear set (4) connected to the first planet gear set (3) and a tool holder (5) securely connected to the second planet gear set (4) for clamping a tip or a drill.

The body (1) is L-shaped, and has a first section and a second section. A first chamber (11) is defined in the first section of the body (1) for receiving a motor (14), a second chamber is defined in a first end of the second section of the body (14) and communicating with the first chamber (11), and a third chamber (not numbered) is defined in a second end of the second section of the body (1). The motor (14) has an output axle (141) extending into the second chamber (12). A first bevel gear (142) in securely attached to a free end of the output axle (141). The shaft (2) is longitudinally rotatably and moved mounted in the second section of the body (1). The shaft (2) has a first end, a second end opposite to the first end and a middle portion (23) formed between the two opposite ends of the shaft (2). The first end of the shaft (2) is received in the second chamber (12) and having a second bevel gear (22) slidably mounted around the shaft (2). The second end of the shaft (2) extends into the third chamber and is formed a first main gear (21) thereon. The second bevel gear (22) is engaged to the first bevel gear (142) such that the shaft (2) is driven by the first bevel gear (142) when the motor is operated. A lever (24) has a first end slidably engaged to the middle portion (23) of the shaft (2) and a second end extending through the body (1) for longitudinally drive the shaft (2) in the second section of the body (1).

The first planet gear set (3) is mounted in the third chamber and includes a first rotator (31) being rotatable relative to the body (1) and having a first hole (312) longitudinally defined in the first rotator (31) for receiving the second end of the shaft (2) and a first stub (310) longitudinally extending from the first rotator (31). The first stub (310) co-axially corresponds to the shaft (2) and has a second main gear (311) formed on a free end of the first stub (310). The first hole (312) has a toothed portion (313) formed near a bottom thereof and selectively engaged to the first main gear (21). A first ring (33) is secured on an inner periphery of the third chamber and surrounds the first rotator (31) such that the first rotator (31) is rotatable relative to the first ring (33). Two first gears (32) are rotatably mounted in the first rotator (31) and partially laterally extending into the first hole (312) for selectively engaged to the first main gear (21). The two first gears (32) diametrically corresponds to each other relative to the first rotator (31) and each partially laterally extending through the first rotator (31) and engaged to a toothed inner periphery of the first ring (33).

The second planet gear set (4) is mounted in the third chamber and includes a second rotator (41) having a second hole (412) longitudinally defined in the second rotator (41) for receiving the first stub (310) of the first rotator (31). A second stub (411) longitudinally extends from the second rotator (41) and co-axially corresponds to the first stub (310) of the first rotator (31). The second stub (411) longitudinally extends through the body (1) and the tool holder (5) is securely connected to the free end of the second stub (411). Two second gears (42) are rotatably mounted in the second rotator (41). The two second gears (42) diametrically correspond to each other relative to the second rotator (41). Each second gear (42) partially laterally extends into the second hole (412) for engaging to the second main gear (311) and through the outer periphery of the second rotator (41). A second ring (43) is secured on the inner periphery of the third chamber and surrounds the second rotator (41). The two second gears (42) are engaged to an inner periphery of the second ring (43).

With reference to FIGS. 1 and 2, the hand tool of the present invention is in a mode of a high rotational speed. The first main gear (21) is engaged to the toothed portion (313) of the first hole (312) in the first rotator (31). The shaft (2) drives the first planet gear set (3) and the second main gear (311) drives the second planet gear set (4). However, the two first gears (32) of the first planet gear set (3) rotate in an idle running because the first main gear (21) is engaged to the toothed portion (313) of the first hole (312) in the first rotator (31). Consequently, the first planet gear set (3) is used as connector that transmissions power from the shaft (2) to the second planet gear set (4) such that the hand tool of the present invention has only one planet gear set (second planet gear set) act for reducing rotational speed of the motor (14).

With reference to FIGS. 1 and 3, the hand tool of the present invention is in a mode of a low rotational speed. The shaft (2) is moved backward relative to the first planet gear set (3) by the lever (24) and the first main gear (21) is engaged to the two first gears (32) of the first planet gear set (3). Consequently, the first planet gear set (3) and the second planet gear set (4) are acted on the hand tool of the present invention for reducing the rotational speed of the motor to output a torsion force greater than that of a high rotational speed of the present invention.

As described above, the position of the shaft (2) decides the tool holder (5) rotates in a high rotational speed (low torsion force) or a low rotational speed (high torsion force) such that the output rotational speed and the torsion can be adjusted to suit various work conditions.

Figure 4:
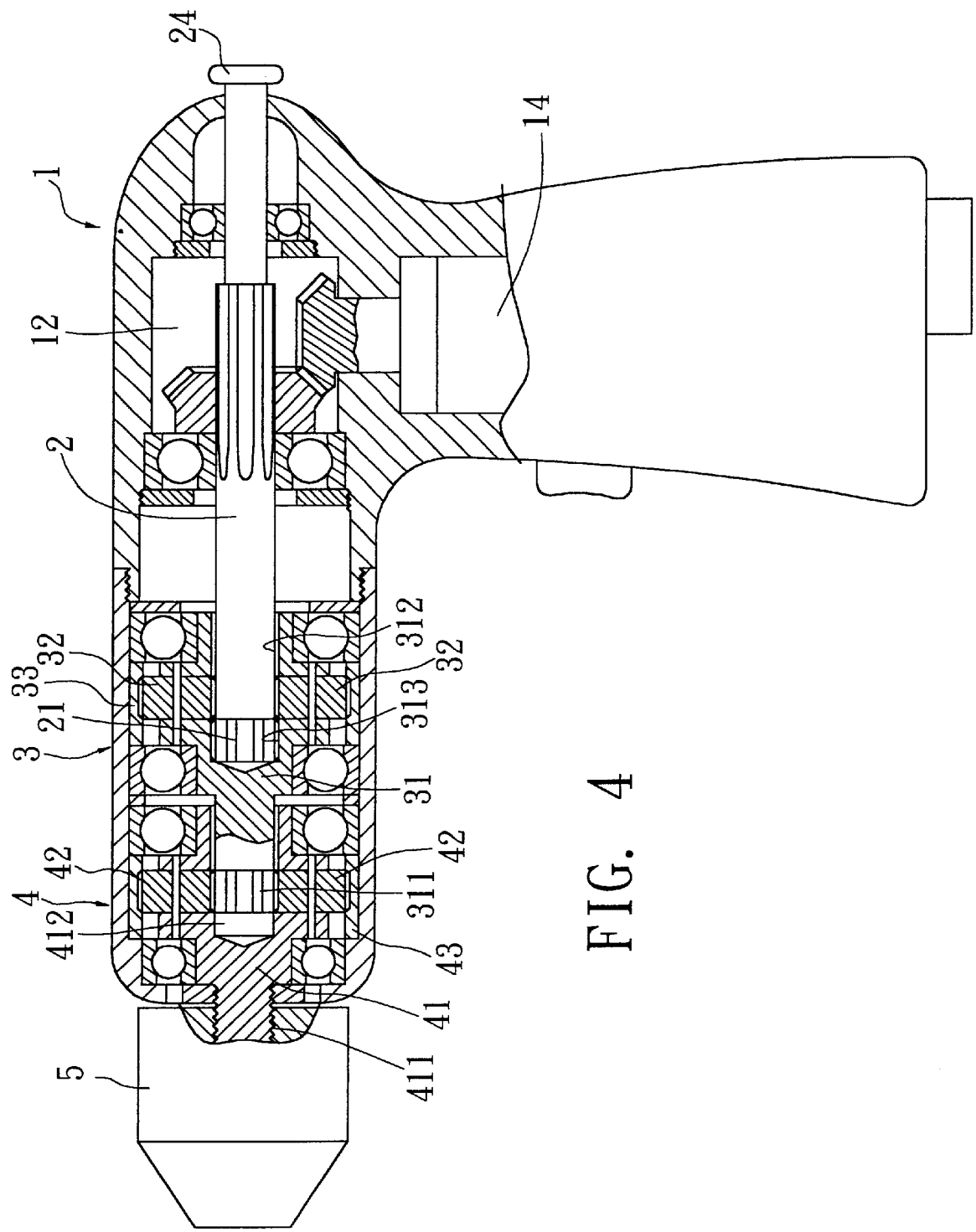
FIG. 4 is a side cross sectional view of a second embodiment of the hand tool with an adjustable rotational speed and torsion force in accordance with the present invention.
Figure 5:
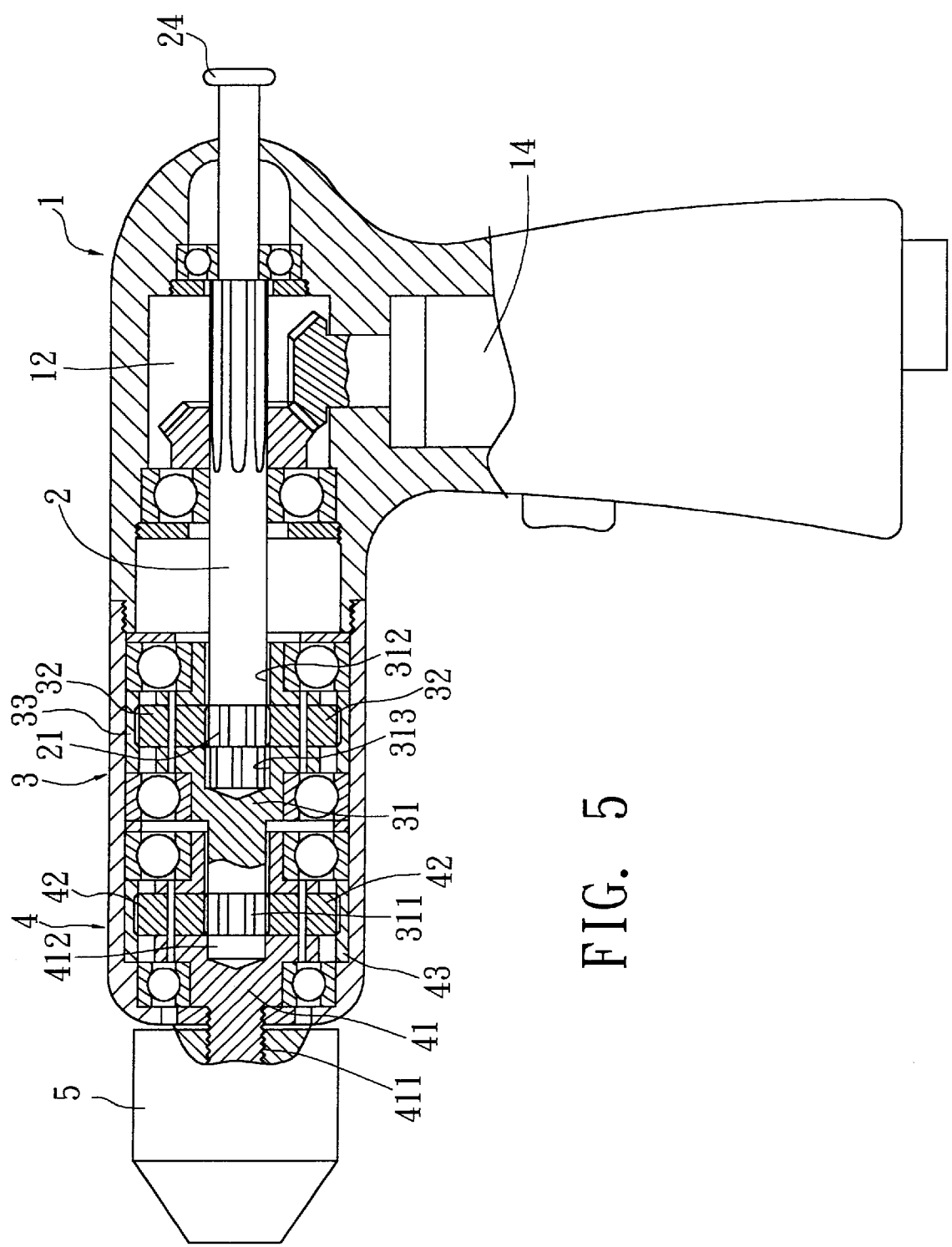
FIG. 5 is another side cross sectional view of the second embodiment of the hand tool with an adjustable rotational speed and torsion force in accordance with the present invention.

With reference to FIGS. 4 and 5 that show a second embodiment of the hand tool in accordance with the present invention. The lever (24) is longitudinally connected to the first end of the shaft (2) and extends through the body (1) via the second chamber in the body (1). Consequently, the user can pull of push the lever (24) to adjust the output rotational speed (torsion force) of the hand tool on the present invention.

Figure 6:
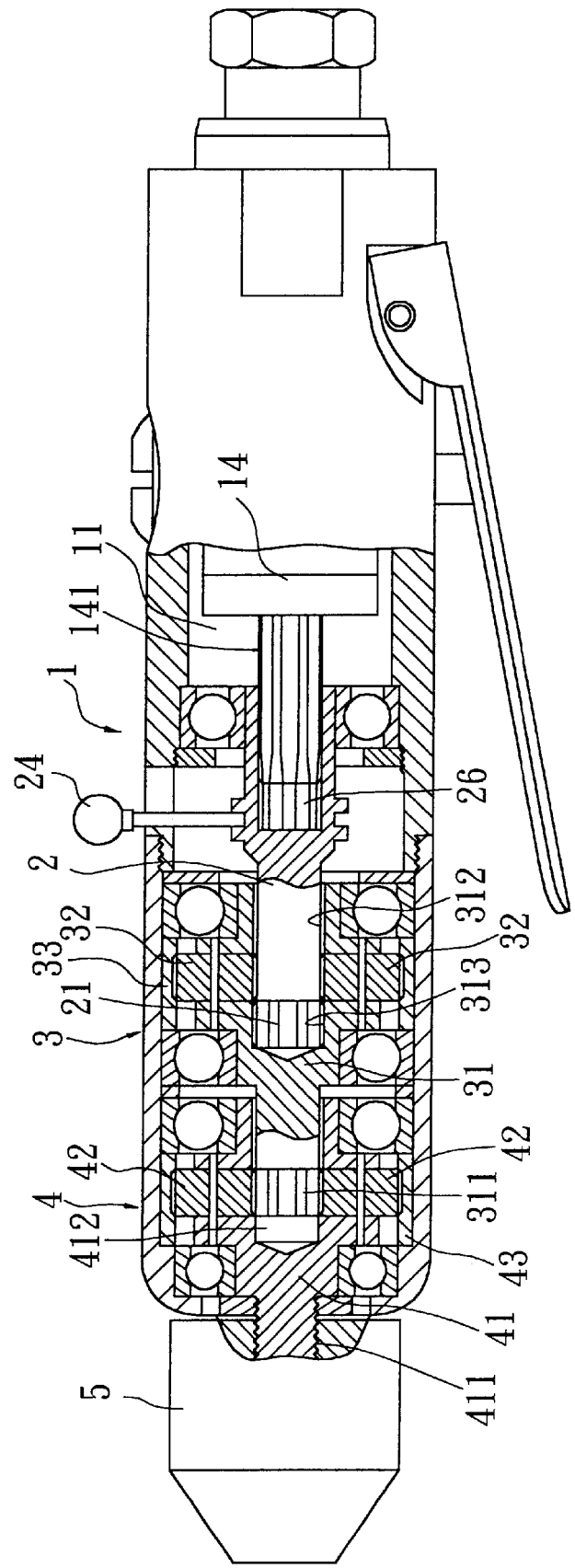
FIG. 6 is a side cross sectional view of a third embodiment of the hand tool with an adjustable rotational speed and torsion force in accordance with the present invention.
Figure 7:
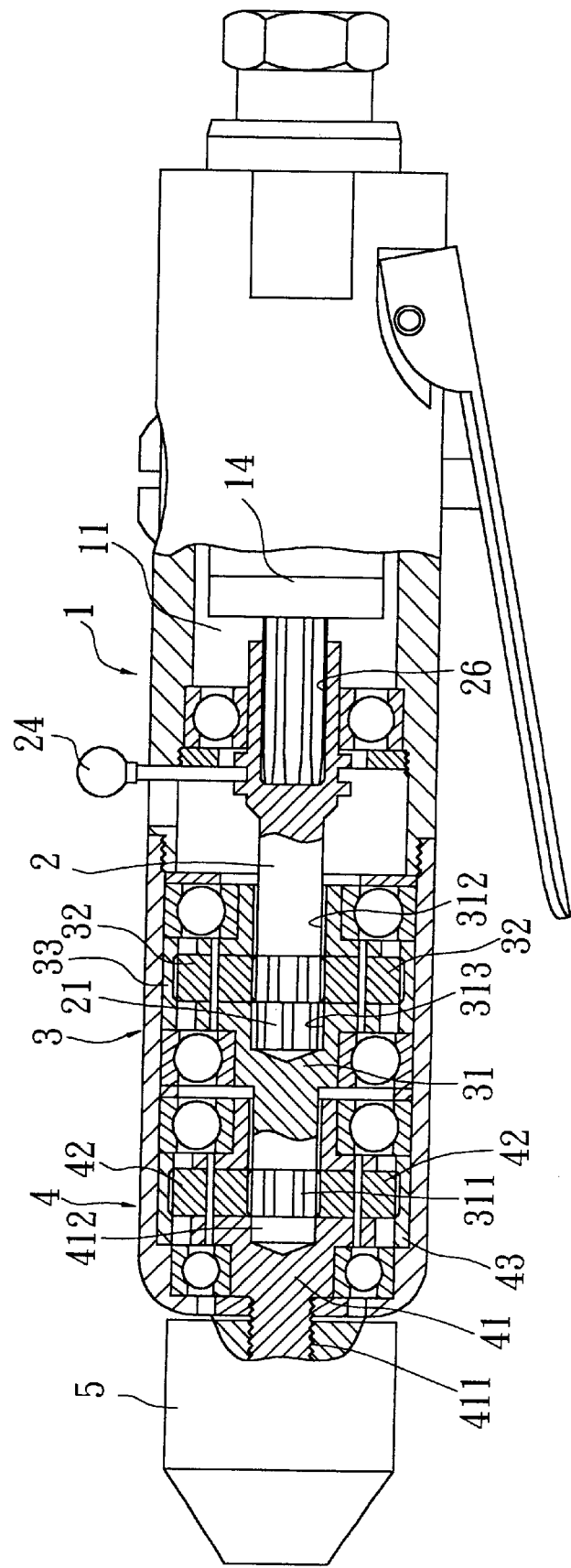
FIG. 7 is another side cross sectional view of the third embodiment of the hand tool with an adjustable rotational speed and torsion force in accordance with the present invention.
Figure 8:
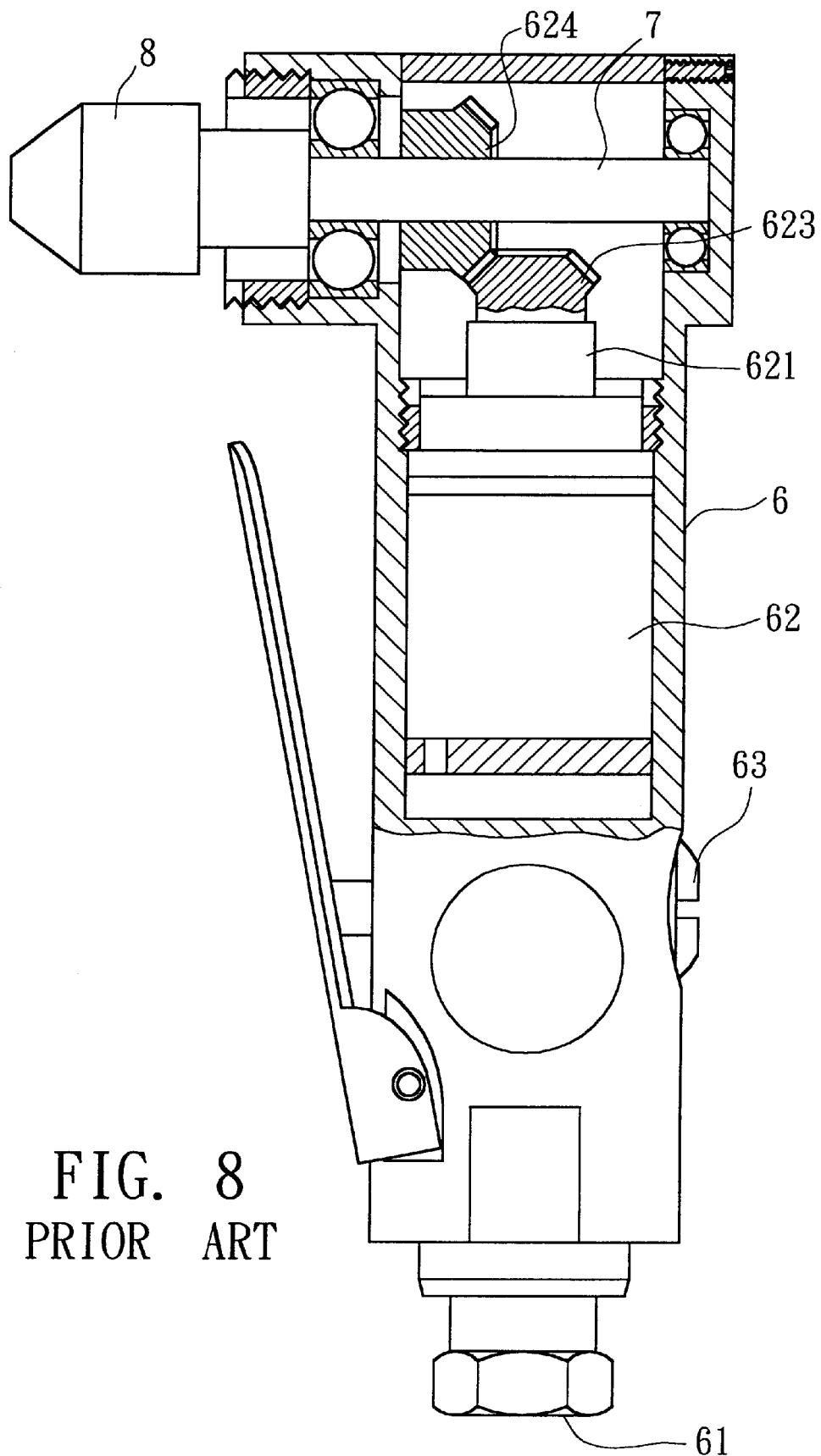
FIG. 8 is partially side cross sectional view of a conventional hand tool in accordance with the prior art.
Figure 9:
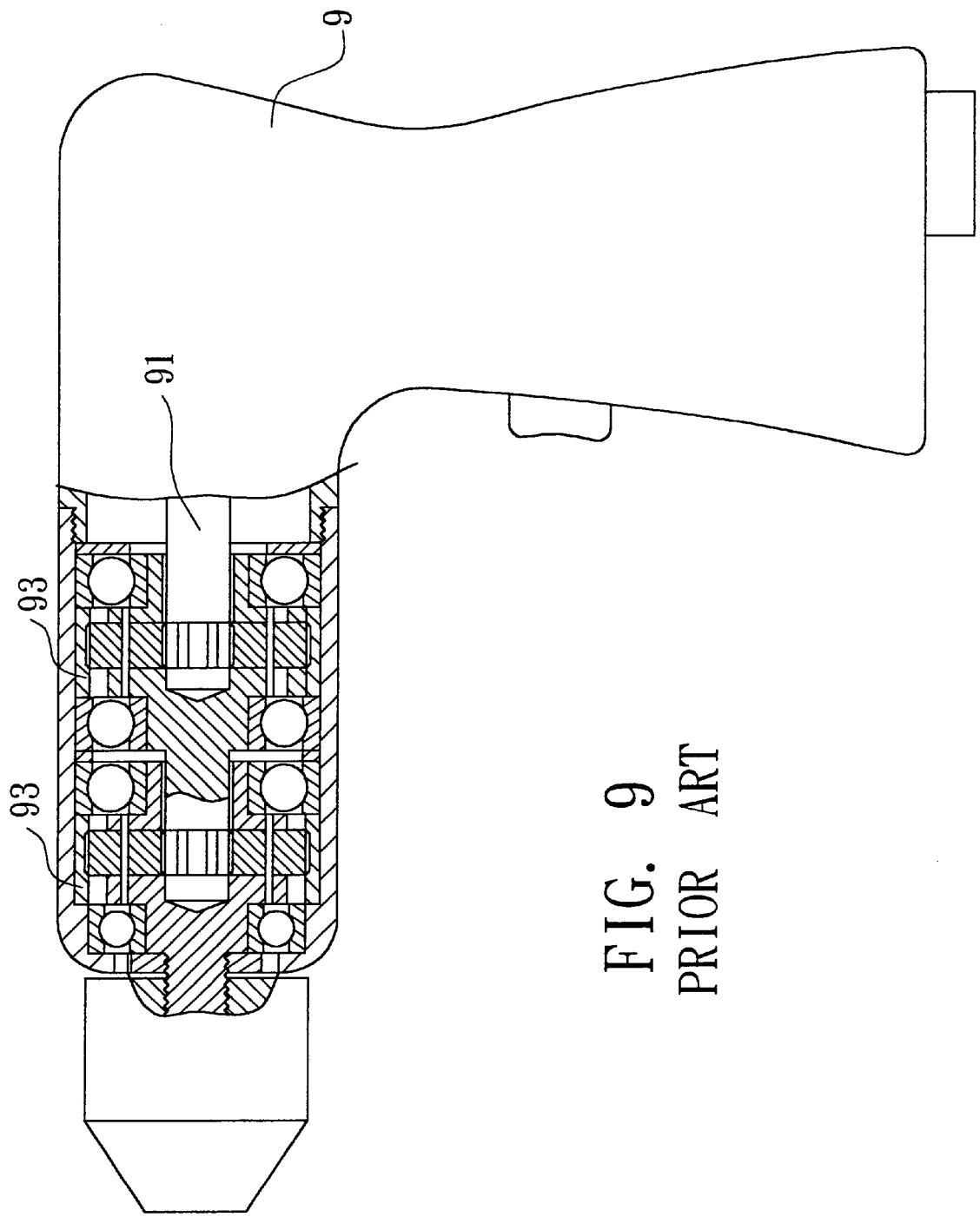
FIG. 9 is partially side cross sectional view of another conventional hand tool in accordance with the prior art.

With reference to FIGS. 6 and 7 that show a third embodiment of the hand tool in accordance with the present invention. The shaft (2) has a toothed hole (26) longitudinally defined in the first end of the shaft (2) and the output axle (141) of the motor (14) is toothed. The output axle (141) is movably received in the toothed hole (26) and engaged to the shaft (2) due to the toothed hole (26) and the toothed output axle (141) of the motor (14).

Although the invention has been explained in relation to its preferred embodiment, it is to be understood that many other possible modifications and variations can be made without departing from the spirit and scope of the invention as hereinafter claimed.

What is claimed is:

1. A hand tool with an adjustable rotational speed and torsion force, comprising:

a hollow body;

a motor securely received in the hollow body and having an output axle partially extending out of the motor;

a shaft rotatably and movably received in the hollow body and driven by the output axle of the motor, the shaft having a first end connected to the output axle of the motor and a second end formed a first main gear;

a first planet gear set mounted in the body and longitudinally connected to the second end of the shaft, the first planet gear set being driven by the shaft and including:

a first rotator being rotatable relative to the body and having a first hole longitudinally defined in the first rotator for receiving the second end of the shaft, the first hole having a toothed portion form near a bottom thereof and the first main gear selectively engaged to the toothed portion of the first hole;

a first stub longitudinally extending form the first rotator and co-axially corresponding to the shaft;

a second main gear formed on a free end of the first stub;

a first ring secured on an inner periphery of the body and surrounding the first rotator such that the first rotator is rotatable relative to the first ring; and two first gears rotatably mounted in the first rotator and partially laterally extending into the first hole for selectively engaging to the first main gear, each first gear laterally extending through the first rotator and engaged to a toothed inner periphery of the first ring;

a second planet gear set mounted in the body and longitudinally connected to the first planet gear set, the second planet gear set being driven by the first planet gear set and including:

a second rotator being rotatably relative to the body and having a second hole longitudinally defined to receive the first stub of the first rotator;

a second stub longitudinally extending from the second rotator through the body, the second stub co-axially corresponding to the first stub of the first rotator;

a second ring secured on the inner periphery of the body and surrounding the second rotator; and two second gears rotatably mounted in the second rotator and partially laterally extending into the second hole for engaging to the second main gear of the first planet gear set, each second gear laterally extending through the second rotator and engaged to a toothed inner periphery of the second ring; and a tool holder securely connected a free end of the second stub of the second planet gear set, the tool holder longitudinally and co-axially corresponding to the second stub of the second planet gear set for clamping a working piece.

2. The hand tool as claimed in claim 1, wherein the body is L-shaped and has a first section and a second section, a first chamber defined in the first section of the body for receiving the motor, a second chamber defined in a first end of the second section of the body and communicating with the first chamber, a third chamber defined in a second end of the second chamber for receiving the first planet gear set and the second planet gear set, the motor having a first bevel gear mounted on a free end of the output axle, the shaft having a second bevel gear received in the second chamber and mounted around the shaft, the shaft being axially movable relative to the second bevel gear.

3. The hand tool as claimed in claim 2 further-comprising a lever having a first end slidably engaged to the middle portion of the shaft and a second end extending through the body for longitudinally drive the shaft.

4. The hand tool as claimed in claim 2 further comprising a lever having a first end co-axially and securely connected to the first end of the shaft and a second end extending through the body for longitudinally drive the shaft.

5. The hand tool as claimed in claim 1, wherein the body is a cylinder, the shaft has a toothed hole longitudinally defined in the first end of the shaft and the output axle of the motor is toothed, the output axle movably received in the toothed hole in the shaft and engaged to the shaft for driving the shaft.

6. The hand tool as claimed in claim 5 further comprising a lever having a first end slidably engaged to the middle portion of the shaft and a second end extending through the body for longitudinally drive the shaft.

* * * * *